United States Patent [19]

Hoff

[11] 4,102,214
[45] Jul. 25, 1978

[54] VARIABLE-SPEED PULLEY AND CLUTCH

[75] Inventor: Stephen J. Hoff, Richmond, Ind.

[73] Assignee: Hoffco, Inc., Richmond, Ind.

[21] Appl. No.: 742,834

[22] Filed: Nov. 18, 1976

[51] Int. Cl.² ............................................. F16H 55/52
[52] U.S. Cl. ............................................... 74/230.17 E
[58] Field of Search ................... 74/230.16, 230.17 R, 74/230.17 B, 230.17 E, 230.17 C, 230.17D

[56] References Cited

U.S. PATENT DOCUMENTS

| | | | |
|---|---|---|---|
| 2,715,842 | 8/1955 | Humuth | 74/230.17 E |
| 2,987,934 | 6/1961 | Thomas | 74/230.17 E |
| 3,362,242 | 1/1968 | Watkins | 74/230.17 E |
| 3,599,504 | 8/1971 | Taylor | 74/230.17 E |
| 3,680,403 | 8/1972 | Schpan | 74/230.17 E |
| 4,028,953 | 6/1977 | Lavallee | 74/230.17 E |

FOREIGN PATENT DOCUMENTS

| | | | |
|---|---|---|---|
| S43146 | 12/1956 | Fed. Rep. of Germany | 74/230.17 |
| 90,764 | 3/1959 | Netherlands | 74/230.17 E |

*Primary Examiner*—Leonard H. Gerin
*Attorney, Agent, or Firm*—Jenkins, Coffey & Hyland

[57] ABSTRACT

A centrifugal clutch and variable-speed pulley has a movable pulley flange mounted for both axial and rotational movement relative to a fixed flange. The fixed flange hub has a cylindrical primary bearing at the opposite side of the pulley groove from the flange and has a hub extension of reduced diameter which provides an elongated outboard bearing surface. The movable flange is on a hub sleeve which has an elongated internal bearing liner engaging the primary bearing and has an outboard bearing riding on the hub extension surface. The hubs have counterbores defining a spring chamber about the hub extension, where a spring acts to urge the flanges apart. Thrust faces on the hubs, radially outward of the spring, come together to limit flange closing movement. Plastic disk-shaped centrifugal weights mounted in angularly spaced channels on the back of the movable flange are normally under preload against a reaction cone on the hub extension, to limit opening movement of the flanges and to provide initial frictional torque drive between the movable flange and the cone. Centrifugal force drives the weights outward along the cone to urge the flanges together. A threaded joint between the hub extension and the fixed flange hub receives spacers to shift the opening limit while maintaining the preload and initial torque drive. A spacer between the hub thrust faces shifts the closing limit position. Equal spacers maintain the same throw while varying the pulley groove width to suit different width belts.

19 Claims, 10 Drawing Figures

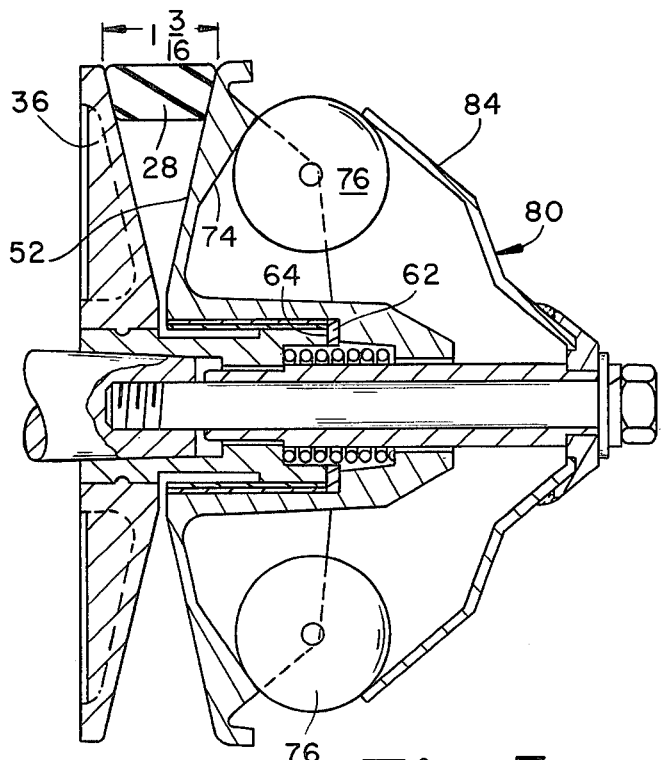
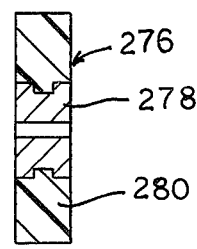
Fig.10
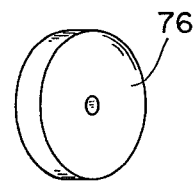
Fig.4
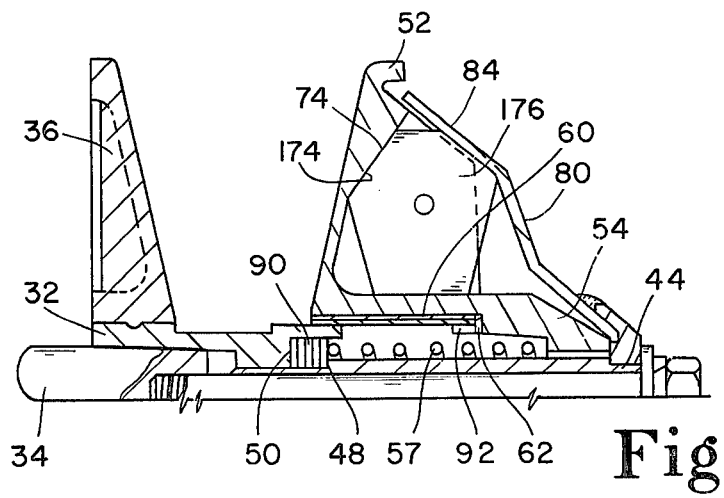
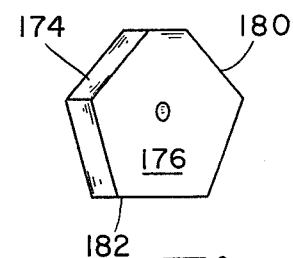
Fig.8
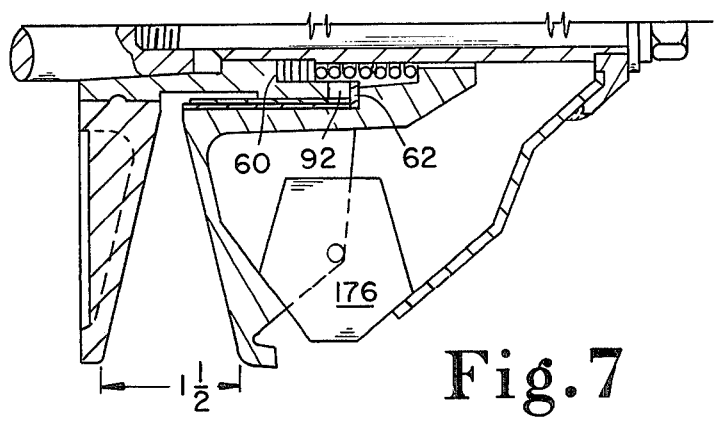

VARIABLE-SPEED PULLEY AND CLUTCH

BACKGROUND OF THE INVENTION

This invention relates to a variable-speed pulley and clutch adapted for use in snowmobiles and other small vehicles. Such pulleys are connected to the engine shaft and may operate at high speeds which subject the rotating parts to high centrifugal forces. The parts must be designed and constructed to withstand high centrifugal forces, and the pulley must be smooth and reliable in its response to operator-controlled changes in the engine shaft speed and to variations in operating conditions. The present invention relates especially to pulleys of the type in which centrifugal weights between the movable pulley flange and a reaction cone connected to the fixed pulley flange force the flange together and provide torque drive between the cone and the movable flange.

In accordance with the present invention, the fixed pulley flange is mounted on a pulley hub which has a cylindrical primary bearing surface at the opposite side of the pulley groove from the flange and has a hub extension of reduced diameter extending therebeyond and providing an elongated outboard bearing surface. The movable pulley flange is carried by a sleeve hub slidably and rotatably mounted on the pulley hub and its extension by means of an inboard bearing surface engaged with the primary bearing and an outboard bearing spaced therefrom and engaged with the bearing surface of the hub extension. The two hubs are counterbored at the inner diameter of the sleeve hub to define a spring chamber about the hub extension which contains a spring that acts on the hubs to urge the flanges apart. To prevent metal-to-metal contact between the two pulley flanges and consequent wear from relative rotation of such flanges, the two hubs are formed with axially-facing thrust faces, radially inward of the primary bearing sleeve and radially outward of the spring, which come together to limit closing movement of the pulley flanges.

The movable pulley flange is urged toward the fixed flange by a selected number of symmetrically disposed plate-like centrifugal weights mounted between the movable flange and a reaction cone fixed to the outer end of the hub extension. The weights are desirably molded plastic disks disposed in radial channels on the face of either the reaction cone or preferably the movable pulley flange, and frictionally engage a surface of revolution on the other of such cone and flange. The limit of opening movement of the flanges is determined by the engagement of the retracted centrifugal weights with the cone and flange, and in consequence the opening-limit position is fixed by the position of the reaction cone which is fixed on the hub extension. The spring applies a preload to the centrifugal weights so as to produce an initial frictional drive between the driven reaction cone and the rotatably mounted movable flange. The movable flange thus has a limited throw, between the closing-limit position determined by engagement of the thrust faces on the hubs and the opening-limit position determined by the position of the reaction cone.

Selective insertion of one or more spacers between the hub thrust faces will shift the closing limit position and thereby open the spacing between the flanges to suit wider belts. Corresponding selective insertion of spacers between the hub extension and the pulley hub, or otherwise in the connection between the reaction cone and the fixed pulley flange, will correspondingly shift the position of the opening limit of the movable flange, by moving the position of the reaction cone. Suitable selection of spacers will maintain the same or secure a different throw of the movable flange in response to action of the centrifugal weights.

Desirably, the hub extension is connected to the main hub by a threaded joint at which axially-facing faces on the two parts come together and which permits the insertion of the spacers between such faces so as to axially adjust the extension (and the reaction cone it carries) relative to the main hub and its fixed pulley flange. This joint is desirably at the end of the spring chamber and the spacers extend under the end of the spring. This has the effect of maintaining the same effective spring length, and the same preload on the centrifugal weights.

The pulley is adaptable to various applications, as by changing the number or mass of centrifugal weights, by shifting the opening limit or the closing limit or both limits of movement of the movable flange, by varying the shape of the reaction cone, etc. In one illustrated modification, the reaction cone is formed with an annular groove which restrains the centrifugal weights until a desired engine speed is attained.

BRIEF DESCRIPTION OF THE DRAWINGS

The accompanying drawings illustrate the invention, and show a preferred embodiment. In such drawings:

FIG. 4 is an isometric view of a disk weight of the type shown in FIGS. 1 and 3;

FIG. 5 is an axial section like FIG. 1, but with the movable pulley flange shown in closed position;

FIGS. 6 and 7 are partial axial sections showing open and closed positions of a pulley like FIG. 1 but with weights of different shape and with spacers between the hub parts;

FIG. 8 is an isometric view of the weight of FIG. 6;

FIG. 10 is a section of a modified weight.

DETAILED DESCRIPTION OF THE PREFERRED EMBODIMENT

Figures 1, 9:
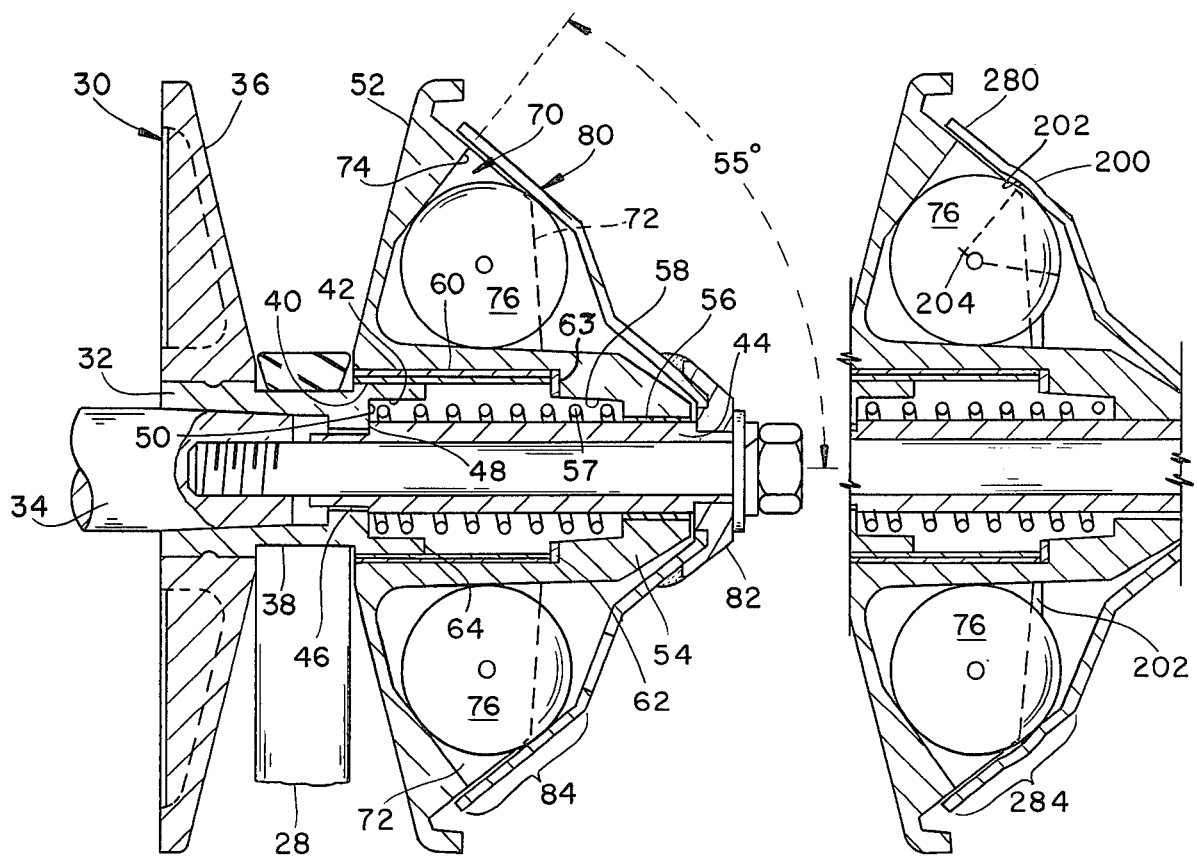
FIG. 1 is an axial section of a variable-speed pulley and clutch embodying the invention, shown in open position and mounted on a power shaft.
FIG. 9 is a partial axial section, like FIG. 1, but showing a modified reaction cone.
Figure 2:
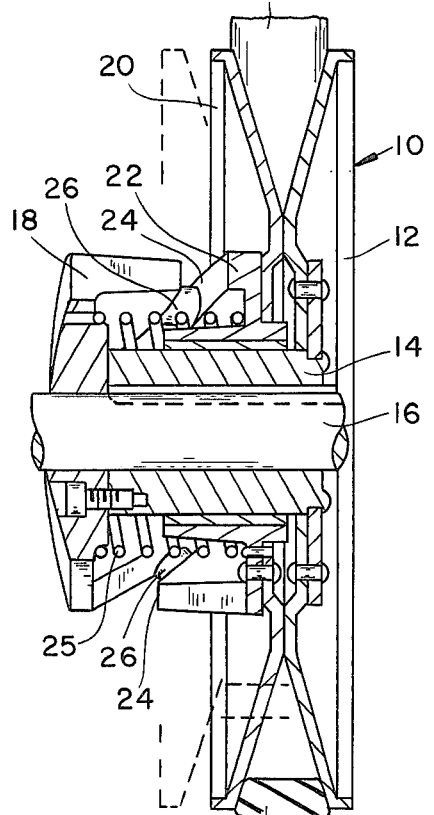
FIG. 2 is an axial section of a driven pulley of a type commonly used with centrifugal driving pulleys, shown in operative relation with the pulley of FIG. 1.

In the drive mechanism represented in FIGS. 1 and 2, the driven pulley 10 comprises a fixed pulley flange 12 carried by a hub 14 fixed on a driven shaft 16 and having a helical cam 18 mounted at its free end. A movable pulley flange 20 is fixed to a hub 22 slidable and rotatable on the hub 14 and formed with helical cam faces 24 for cooperation with cam follower pads 26 on the cam member 18. The pulley flanges 12 and 20 define a variable width V-groove to receive a belt 28 and are normally urged toward closed position, as shown, by a torsion spring 25 acting between the cam member 18 and the hub 22.

Centrifugal actuation of the speed-responsive pulley of FIG. 1 tends to pull the belt 28 deeper into the V- groove of the driven pulley 10 and force its flanges 12 and 20 apart, with concurrent rotation of the flange 20 relative to the fixed flange 12 so as to cause the helical cam 24 to back off and permit such separation. Increased torque reaction from the output shaft 16 actuates the cams to force the flanges 12 and 20 together, and this forces the belt 28 outward in the V-groove of the driven pulley 10 and increases the drive ratio to permit the power train to handle the increased torque. Further discussion of this torque-responsive driven mechanism is to be found in my U.S. Pat. No. 3,625,079.

The variable-speed pulley 30 shown in FIG. 1 comprises a fixed pulley flange 36 and a movable pulley flange 52 normally biased to open position (FIG. 1) by a spring 57 and moved toward closed position (FIG. 5) by the action of centrifugal weights 76 acting between the movable flange and a reaction member fixedly connected to the fixed flange.

The fixed pulley flange 36 is fixed to one end of a hollow hub 32 mounted on a power shaft 34. The hub 32 has a grooved cylindrical portion 38 immediately adjacent the pulley flange 36, and therebeyond has a cylindrical primary bearing 40 of slightly greater diameter than the grooved portion 38 and of substantial axial length. The bearing terminates at an axially-facing thrust face 64. A counterbore 42 in such hub defines one end of a spring chamber 58. In operation, the grooved portion provides clearance for belt dust which might otherwise obstruct the bearing. A hub extension 44 is threaded into a central bore 46 of the hub 32. Such hub extension 44 is of larger diameter than the bore 46 and is formed with a shoulder 48 which seats against the face 50 at the bottom of the counterbore 42 in the hub 32. The male part of the threaded joint is relatively long, to permit the insertion of spacers between the shoulder and face, as described below. The hub extension provides an elongated bearing surface at its outer circumference.

The movable pulley flange 52 is integral with a hollow sleeve hub 54, which in pulley-open position extends from the face of the pulley flange 52 axially substantially to the end of the hub extension 44. Its outer end contains an outboard bearing sleeve 56 in bearing engagement with the outer surface of the hub extension 44. Over an intermediate length, the movable hub 54 is counterbored to provide the right end of the spring chamber 58. The left end of the movable hub 54, adjacent the pulley flange 52, is formed to receive an elongated bearing sleeve 60 which slidably and rotationally engages the bearing 40 on the hub 32. Such length is sufficient to provide bearing support on the bearing 40 throughout the axial throw of the movable flange. At the inner end of the bearing sleeve 60, a hardened thrust washer 62 is mounted between the end of such sleeve 60 and the abutting shoulder 63 of the sleeve hub. The face of that thrust washer 62 is spaced from the end face 64 of the hub 32 a distance slightly less than the normal open distance between the inner peripheral portions of the two pulley flanges 36 and 52, so that when the movable pulley flange 52 moves toward the fixed pulley flange 36, the thrust faces 62 and 64 will engage before the pulley flanges 36 and 52 come together. The hub 32 is normally of steel or other wear-resistant material, and the thrust washer 62 is of a material with good wear resistance against the steel end face 64, whereas the pulley flanges 36 and 52 may be of die cast aluminum with poor wear characteristics.

Figure 3:
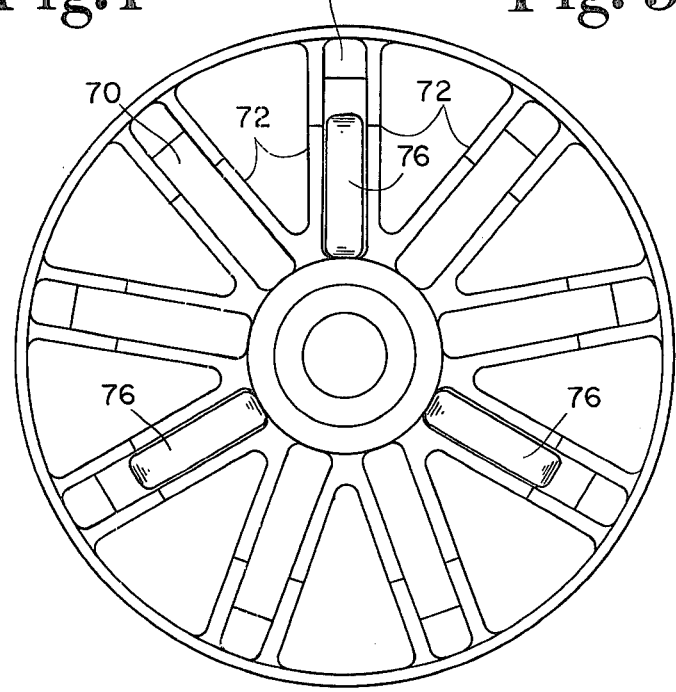
FIG. 3 is an end elevation of the movable pulley flange of FIG. 1, shown with three disk weights symmetrically disposed in its nine weight-receiving channels.

As shown in FIG. 3, the rear face of the movable pulley flange 52 is formed with a plurality of angularly spaced weight-receiving channels 70, defined between pairs of parallel ribs 72 which are integral with the hub 54 and the flange wall 52 and extend from the hub 54 outward to points adjacent the rim of the movable flange 52. As shown in FIGS. 1 and 5, the ribs 72 are of sufficient axial width to contain and stabilize the centrifugal weights which they receive, both when such weights are retracted as in FIG. 1 and when they are at their outward limit of centrifugal movement as in FIG. 5. The bottoms of the weight-receiving channels 70 are desirably formed with ramp surfaces 74 at an angle to give the desired pulley flange movement in response to centrifugal movement of the weights, which may be a different angle from that of the belt-engaging face of the pulley flange 52. In the embodiment shown, the ramp angle is approximately 55° from the axis of the pulley 30.

The weight-receiving channels 70 receive plate-like centrifugal weights 76 which in the preferred embodiment of FIGS. 1–5 are in the form of circular disks. These are desirably molded of wear-resistant plastic material. By way of example, it has been found satisfactory to use disks 76 molded of a thermoplastic material obtainable from E. I. DuPont deNemours & Co., Wilmington, Del., under the trademark "Minlon". The disk weights 76 should be molded to fit with a free-sliding fit between the ribs 72, and with a diameter such that when retracted, as shown in FIG. 1, they lie engaged between the outer surface of the movable sleeve hub 54, the ramp surface 74, and the inner face of the reaction cone 80 more fully described below. In this position they determine the limit of opening movement of the movable pulley flange 52, and are under preload from the spring 57 in the spring chamber 58. With such preload they at all times exert some frictional pressure against the face of the reaction cone 80 which is driven with the fixed pulley flange 36, and this provides a frictional driving connection between that cone 80 and the movable pulley flange 52 which is otherwise free to rotate on the hub 32 of the fixed flange 36 and its hub extension 44.

The reaction cone 80 is a generally conical member having an inner face defined by a surface of revolution about the axis of the hub 32. The cone is fitted at its apex to a drive washer 82, and the two are welded together so that the cone will be rotatably driven with the drive washer 82. The drive washer 82 is mounted on the end of the hub extension 44, as by engagement with a flatted end portion thereof so that the drive washer 82 and the reaction cone 80 are rigid with the hub extension 44 and rotatably driven thereby. The outer or working portion 84 of the cone is engaged by and takes the reaction of the centrifugal weights 76 in the operation of the pulley. As shown in FIGS. 1–5, this working portion 84 has an inner face which is a section of a regular cone and has a uniform slope throughout its axial extent. In the embodiment shown, that slope is at 40° to the axis of the shaft.

The operation of the pulley shown in FIGS. 1–5 is as follows. The movable pulley flange 52 and its hub 54 are normally urged to the right by the spring 57. The limit of its opening movement is determined by engagement of the weights 76 with the surrounding surfaces, especially that of the reaction cone 80, and the end of the sleeve hub 54 clears the reaction cone 80. The pulley then lies in open position as shown in FIG. 1, with the belt 28 loosely received at the bottom of the pulley groove and free from driving relation with the pulley. The weights 76 are under a preload exerted by the spring 57, and are held in their channels 70 and stabilized by the ribs 72 defining those channels. They have frictional engagement with the conical working portion 84 of the reaction cone 80, and this is sufficient to transmit torque from the cone 80 to the weights 76 and through them to the movable flange 52 of the pulley. When the pulley 30 is driven by the drive shaft 34, the hub 32 and its extension 44, the fixed pulley flange 36, and the reaction cone 80 are all positively driven. The reaction cone 80 transmits frictional drive to the weights 76 and they in turn drive the movable pulley flange 52. As centrifugal force on the weights 76 increases, the rotational drive between those elements continues and the weights 76 are driven outward along the reaction cone 80 and the ramps 74 of the flange 52, and this drives the movable flange 52 toward the fixed flange 36. The pulley then engages the belt 28 to clutch the two together, and thereafter to force the belt outward in the pulley groove toward the position shown in FIG. 5.

Closing movement of the movable flange 52 and its hub 54 toward the fixed pulley flange 36 is limited by engagement of the thrust washer 62 against the thrust face 64, and this stops the movement of the pulley flanges toward each other at a point which leaves some clearance between their inner peripheries so that they will not be subjected to wear at that point. As seen in FIG. 5, when the pulley flanges are fully closed, the weights 76 are trapped between the outer end of the ramps 74 on the movable pulley flange 52 and the outer portion of the cone 80.

As shown in FIGS. 1-5, the pulley is adapted and arranged for use with a belt of predetermined narrow width, for example, a belt having a nominal width of 1 3/16 inches, as indicated at the top of FIG. 5. The same pulley may be adapted for use with wider belts by the insertion of certain spacers, as shown in FIGS. 6 and 7. At the threaded joint between hub extension 44 and the hub 34, a selected number of spacer washers 90 (here shown as five) are inserted between that shoulder 48 on the extension 44 and the end face 50 of the hub 32, so that the hub extension 44 then extends farther outward from the hub 32. Such washers are desirably large enough to extend under the end of the spring 57, so as to maintain the same spring length. One or more spacers 92 are also inserted within the bearing sleeve 60 and against the thrust washer 62, but in this case a single spacer 92 of selected length is desirably used instead of separate washers, since the spacer will be loose between the thrust faces 62 and 64. The spacers 90 have the effect of shifting the limit of opening movement of the movable pulley flange 52 to the right. The spacer 92 similarly shifts to the right the limit of closing movement of the flange 52. When the spacers 90 and 92 are of equal length, they maintain the throw or travel of the movable flange the same, and likewise maintain the length of the spring chamber containing the spring 57 the same, since both ends of such chamber are moved the same distance.

Instead of the disk-shaped weights 76 shown in FIGS. 1-5, plate weights of other shapes may be used, for example, as shown in FIGS. 6-8. Here, the weights 176 are plates of irregular hexagonal shape. Each plate has a flat shoulder 174 to mate with the ramp 74 of the channel in which it is mounted, has a shoulder 180 to mate with the working portion 84 of the reaction cone 80, and a bottom 182 to fit against the outer surface of the hub 54 of the movable pulley flange 52. When that flange is in open position as shown in FIG. 6, each weight 176 has its shoulders and bottom seated against their mating faces, and the weight is held under a preload by reason of the presence of the spring 57, in the same manner as the weights in FIGS. 1-4. The hexagonal weights provide somewhat greater surface area of contact between the weights and their mating surfaces than is the case with the disk-shaped weights 76.

The pulley of FIGS. 6-8 operates in substantially the same way as that of FIGS. 1-5. As centrifugal force drives the weights 176 outward, their shoulders 174 and 180 slide on the ramps 74 of the flange 52 and on working portion 84 of the cone 80, so as to force the movable pulley flange 52 toward closed position as shown in FIG. 7. Closing movement is limited by engagement of the thrust washer 62 and thrust face 60 against the spacer 92, and the pulley flanges are then held in a spacing suitable for the wider belt. The principal difference of operation is that the spacers adapt the pulley for use with a wider belt, for example, a belt of 1½ inch width as shown at the bottom of FIG. 7 instead of the 1 3/16 inch belt shown in FIG. 5.

Instead of using a reaction cone 80 having a straight conical working portion 84 as shown in FIGS. 1-5, the shape of the working portion of the cone may be modified to produce special operating results. For example, under some operating conditions of snowmobile drives, it is desirable to maintain the driven belt 28 deep in the pulley groove so as to obtain high torque multiplication as the speed of the engine is increased to a desired point on the power curve of the engine. For this purpose, a circumferential bulge 200 is formed in the reaction cone 280 of FIG. 9, the cone being otherwise similar to the cone 80 of FIG. 1. This provides a shallow circumferential groove 202 in the inner face of the working portion 284 of the reaction cone, into which the weights 76 will enter as they being outward movement under centrifugal force, and in which they will be restrained from further outward movement until the desired shaft speed has been built up and sufficient centrifugal force generated to carry them out of the groove. In order to preserve the desired preload, without otherwise modifying the structure shown in FIG. 1, the circumferential groove 202 is not positioned to conform to the periphery of the weights 76 in their retracted position, but is displaced slightly outward from such position so as to leave undisturbed that portion of the cone which engages the weights in their retracted position shown in FIG. 9. As shown in FIG. 9, the circumferential groove 202 is desirably of the same arcuate shape, on the same radius, as the periphery of the weights 76, but is offset outward and curved about a center 204 somewhat displaced from the center of the weights 76. This locates the groove 202 in a position to be entered by the weight as it begins to move outward along the surface of the reaction cone 280.

In operation of the pulley of FIG. 9, having a groove 202 in the face of the reaction cone, the weights 76 will be held under preload in their normal retracted position when the pulley is wide open. As the centrifugal action of the pulley moves the weights outward, they enter the groove 202, and are there temporarily restrained and trapped until the shaft speed has increased to the desired point. The increased speed increases the centrifugal force on the weights 76, and they then move outward beyond the circumferential groove 202 so as to force the pulley flanges toward each other and to move the belt 28 to its outermost position in the same manner as before.

The action of the pulley may be varied in other ways to suit different power requirements and different applications. The structure permits change in the arrangement and mass of the weights used. Thus, the nine channels 70 of the movable flange of FIG. 3 may be fitted with either three weights as shown, or with six or with nine weights in arrangements which are symmetrical about the axis and avoid unbalance. The mass of the weights may be changed by molding metal inserts in them. As shown in FIG. 10, the weight 276 consists of a central metal insert 278 of spool shape, about which an annulus 280 of plastic material is molded. The metal increases the mass. Alternatively, different molding compositions may be used which include fillers of heavier or lighter weight.

The pulley may be adapted for use with belts of different width by inserting spacers 90 and 92 of selected lengths. The throw of the movable flange 52 may be varied by inserting spacers 92 of one length and inserting no spacers or shorter spacers 90. The pulleys of this invention is thus adapted to a wide variety of uses by relatively simple modifications without major changes in the basic structure.

I claim:

1. A variable-speed pulley, comprising a fixed pulley flange and a movable pulley flange movable toward and away from the fixed pulley flange to vary the width of the belt-receiving groove,
   said fixed flange being carried by a pulley hub extending across the pulley groove, having a cylindrical primary bearing of substantial length at the opposite side of the groove, and having an end thrust face at the end of said bearing,
   a hub extension fixed to said hub, extending beyond said thrust face and providing an extended bearing surface of smaller diameter than said primary bearing surface,
   the movable flange being carried by a sleeve hub having a cylindrical inboard bearing surface engaged with said primary bearing and movable axially and rotationally thereof, said inboard bearing surface being of sufficient length to support the sleeve hub on said primary bearing throughout the opening and closing movement of the movable flange,
   a thrust face on the sleeve hub radially inward of said inboard bearing surface and positioned to engage the end thrust face of said pulley hub so as to limit the closing movement of the pulley flanges,
   an outboard bearing on said sleeve hub, axially beyond and radially inward of said thrust faces, engaged with the extended bearing surfaces of the hub extension, and movable along said extension so as to support said movable pulley flange throughout its movement,
   a reaction member fixed at the end of said hub extension,
   centrifugal weights acting between the movable pulley flange and said reaction member and operative to move the movable flange in pulley-closing direction in response to centrifugal force generated by rotation of the pulley,
   said structure being adapted to receive one or more spacers between said thrust faces on the pulley hub and sleeve hub and thereby vary the closed width between the ulley flanges.

2. A variable-speed pulley as in claim 1 in which
   the axial position of said reaction member serves to determine the limit of pulley-opening movement of the movable pulley flange and thereby to interact with the thrust faces on the hubs to determine the throw of the movable pulley flange,
   the connection between the reaction member and the pulley hub having at least one separable joint adapted to receive one or more spacers of selected axial length so as to vary the limit position of pulley-opening movement.

3. A variable-speed pulley as in claim 2 with the addition of one or more spacers mounted in said separable joint and operative to change the limit position of pulley-opening movement of the movable pulley flange.

4. A variable-speed pulley as in claim 3 with the addition of one or more spacers mounted between the thrust faces on the hubs and operative to change the limit position of pulley-closing movement of the movable pulley flange.

5. A variable-speed pulley as in claim 4 in which said spacers are of equal length so as to change both limits by the same amount and maintain the same throw of the movable pulley flange.

6. A variable-speed pulley as in claim 2 in which said separable joint is a threaded joint between the hub extension and the pulley hub at which axially-facing surfaces of the hub extension and pulley hub come together and between which surfaces the spacers are adapted to be received.

7. A variable-speed pulley, comprising
   a fixed pulley flange and a movable pulley flange movable toward and away from the fixed flange to vary the width of the belt-receiving groove,
   said fixed flange being carried by a pulley hub having a cylindrical primary bearing surface thereon over a length disposed at the opposite side of the groove from the fixed flange,
   a hub extension connected to said pulley hub and providing an extended bearing surface of smaller diameter than said primary bearing surface,
   the movable flange being carried on a sleeve hub having a elongated inboard bearing surface engaged with said primary bearing and an outboard bearing engaged with said extended bearing surface so as to support the movable flange for rotatable and axial sliding movement throughout its throw toward and away from the fixed flange,
   a reaction member fixed to said hub extension,
   centrifugal means acting between said reaction member and the movable pulley flange to move the latter toward the fixed pulley flange, said centrifugal means having a retracted position in which the position of the reaction member determines the limit of movement of the movable pulley flange away from the fixed pulley flange and determines the open width of the pulley groove between the flanges,
   said connection between the hub extension and the pulley hub being a threaded joint at which axially-facing surfaces of the hub extension and the pulley hub come together to determine the axial position of the hub extension relative to the pulley hub, said joint being constructed and arranged to receive one or more spacers between said axially-facing surfaces so as to vary such relative axial position and thereby vary the position of the reaction member and limit position determined thereby for the opening movement of the movable flange.

8. A variable-speed pulley as in claim 7 with the addition of one or more spacers mounted in said separable joint and operative to change the limit position determined by the reaction member.

9. A variable-speed pulley as in claim 7 with the addition of thrust faces on said pulley hub and sleeve hub which come together so as to limit the closing movement of the movable pulley flange toward the fixed pulley flange, the structure being constructed and arranged for the reception of one or more spacers between said thrust faces so as to vary the limit position of said closing movement.

10. A variable speed pulley as in claim 9 with the addition of spacers mounted both in said separable joint and between said thrust faces so as to change in the same direction both the limit of opening movement and the limit of closing movement of the movable flange.

11. A variable-speed pulley as in claim 7 in which
said centrifugal means comprises radially-movable weights having frictional engagement with a surface of revolution on one of said movable pulley flange and said reaction member, the arrangement being such that such frictional engagement constitutes substantially the only torque transmitting connection between the reaction member and the movable pulley flange, and controls the opening-movement limit position of movable pulley flange relative to the reaction member,
a spring biasing the movable pulley flange toward its limit position so as to exert a preload between said movable weights and said surface of revolution and thereby create an initial torque transmitting connection between the reaction member and the movable pulley flange,
said spacers in the hub joint serving to move the limit-determining position of the reaction member and said spring being operative to maintain a preload between said weights and said surface of revolution in the moved position.

12. A variable-speed pulley as in claim 11 in which said spring is coiled about said hub extension in position to act against the surface of the pulley hub which receives said spacers, and spacers mounted in said joint and between the spring and said surface so as to maintain the same effective length of the spring and thereby maintain the same preload between the weights and said surface of revolution.

13. A variable-speed pulley as in claim 12 with the addition of means to limit closing movement of the movable flange, and means to move the limit position correspondingly with the movement produced by said spacers, so as to maintain a substantially constant throw for the movable flange.

14. A variable-speed pulley, comprising
a fixed pulley flange and a movable pulley flange movable toward and away from the fixed flange to define the belt-receiving groove of variable width therebetween,
said fixed flange being carried by an elongated hub or the like,
a reaction member fixed on said hub and spaced from the fixed flange,
said movable flange being carried by a sleeve slidable and rotatable on said hub between the fixed flange and the reaction member,
one of said reaction members and movable flange defining a conical surface of revolution facing and diverging toward the other of such elements,
means forming a plurality of narrow angularly-spaced, axially-extending weight-receiving channels between said reaction member and movable flange,
weight-engaging face means on said other of such elements at the opposite end of said channels from said conical surface, said face means extending substantially straight in radial planes,
a plurality of narrow centrifugal weights mounted in said angularly spaced channels and confined thereby for movement in the planes of the channels, each such weight having a first straight face for slidably engaging said conical surface over an extended radial length thereof, and each weight also having a second straight face for slidably engaging the face means on said other of such elements over an extended radial length thereof,
said weights being movable outward under centrifugal force in sliding engagement over such extended radial lengths so as to thrust said movable flange away from said reaction member and toward said fixed flange,
the extended radial lengths of engagement serving to oppose rotation of the weights and to reduce wear at the engaging faces.

15. A variable-speed pulley as in claim 14 in which said channels are defined by radial pairs of walls extending between the movable flange and its supporting sleeve, said weight-engaging face means being formed on the movable flange at the bottoms of the channels, said channel bottoms and second faces on the weights being formed to having sliding contact with each other during centrifugal movements of the weights.

16. A variable-speed pulley as in claim 14 in which each said weight has a third straight face at the radially inner edge thereof adapted to seat on the sleeve which carries the movable flange.

17. A variable-speed pulley as in claim 15 in which each said weight has a third straight face at the radially inner edge thereof adapted to seat on the sleeve which carries the movable flange.

18. A variable-speed pulley as in claim 16 with the addition of spring means biasing said movable flange and its sleeve toward said reaction member, the arrangement being such that the weights are thereby trapped between the elements engaged by their first, second, and third faces and are preloaded in engagement therewith so as to transmit torque beween themselves and said conical surface of revolution.

19. A variable-speed pulley as in claim 14 with the addition of spring means biasing said movable flange and its sleeve toward said reaction member, the arrangement being such that the weights are thereby preloaded against said reaction member and weight-engaging face means of said other of such elements.

* * * * *

UNITED STATES PATENT OFFICE
CERTIFICATE OF CORRECTION

Patent No. 4,102,214      Dated July 25, 1978

Inventor(s) Stephen J. Hoff

It is certified that error appears in the above-identified patent and that said Letters Patent are hereby corrected as shown below:

Column 6, line 7, change "presence" to --pressure--;

line 40, change "being" to --begin--.

Column 7, line 24, change "pulleys" to --pulley--.

Column 8, line 2 (claim 1), change "ulley" to --pulley--;

line 45 (claim 7), change "a" to --an--.

Column 10, line 40 (claim 15), after "sliding" insert --surface--.

Signed and Sealed this

Sixteenth Day of January 1979

[SEAL]

Attest:

RUTH C. MASON
*Attesting Officer*

DONALD W. BANNER
*Commissioner of Patents and Trademarks*